(12) United States Patent
Benthien (10) Patent No.: US 8,382,038 B2
(45) Date of Patent: Feb. 26, 2013

(54) DEVICE, IN PARTICULAR CONNECTION ROD, FOR BRACING A FUSELAGE STRUCTURE OF AN AIRCRAFT AND/OR FOR FASTENING A COMPONENT

(75) Inventor: Hermann Benthien, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/521,247

(22) PCT Filed: Jan. 11, 2008

(86) PCT No.: PCT/EP2008/050292
§ 371 (c)(1),
(2), (4) Date: Jan. 20, 2011

(87) PCT Pub. No.: WO2008/090039
PCT Pub. Date: Jul. 31, 2008

(65) Prior Publication Data
US 2011/0108668 A1     May 12, 2011

(30) Foreign Application Priority Data

Mar. 9, 2007    (DE) .......................... 10 2007 011 621

(51) Int. Cl.
*B64C 1/06*     (2006.01)
(52) U.S. Cl. ........................................ 244/131; 244/119
(58) Field of Classification Search .................. 244/131, 244/119, 117, 118.5, 118.6, 129.5, 129.4
See application file for complete search history.

(56) References Cited

U.S. PATENT DOCUMENTS

| | | | |
|---|---|---|---|
| 571,042 | A | 11/1896 | Edquist |
| 1,774,593 | A | 9/1930 | Day et al. |
| 2,194,483 | A | 3/1940 | Schmidt |

(Continued)

FOREIGN PATENT DOCUMENTS

| | | |
|---|---|---|
| DE | 31 41 869 A1 | 5/1983 |
| DE | 19724941 | 12/1998 |

(Continued)

OTHER PUBLICATIONS

International Search Report for PCT/EP/2008/050292 dated May 19, 2008.

(Continued)

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

The invention relates to a device, in particular a connection rod, for bracing a fuselage structure and/or for fastening components on the fuselage structure.
In one embodiment, the joints are integrated into fuselage structure for linking on both sides of connection rod to fuselage structure. As a result of the integration of joints, a reduced number of individual parts is produced in comparison to previously known embodiments, which leads to a reduction in weight, a reduced maintenance and servicing outlay and an improved reliability against failure. Moreover, device according to the invention enables the introduction of forces in the region of neutral fibers of fuselage structure. A further configuration of device provides only a one-sided articulated linking of a component to fuselage structure by means of (first) end portion. Second end portion is screwed to fuselage structure. To this end, both end portions are provided with a thread at least in sections.

13 Claims, 6 Drawing Sheets

U.S. PATENT DOCUMENTS

| | | | |
|---|---|---|---|
| 2,403,881 A | | 7/1946 | Tarbox |
| 2,556,076 A | | 6/1951 | Evans et al. |
| 2,556,077 A | | 6/1951 | Fetterly et al. |
| 2,625,118 A | | 1/1953 | Lechner |
| 2,642,109 A | | 6/1953 | Hollerith |
| 2,700,412 A | | 1/1955 | Evans et al. |
| 2,758,365 A | | 8/1956 | Ricefield |
| 2,789,457 A | | 4/1957 | Allen |
| 2,920,672 A | | 1/1960 | Bronson |
| 3,208,496 A | | 9/1965 | Phelan |
| 3,314,720 A | | 4/1967 | Millington et al. |
| 3,463,424 A | | 8/1969 | Pickell |
| 3,765,626 A | * | 10/1973 | Maynard et al. ........... 244/129.5 |
| 3,866,955 A | * | 2/1975 | Maynard et al. ........... 285/121.3 |
| 3,868,143 A | | 2/1975 | Reilly |
| 4,005,765 A | | 2/1977 | Reilly |
| 4,048,960 A | | 9/1977 | Barnidge et al. |
| 4,266,381 A | | 5/1981 | Deller |
| 4,392,623 A | | 7/1983 | Munsen et al. |
| 4,479,621 A | | 10/1984 | Bergholz |
| 5,180,263 A | | 1/1993 | Flowers, Jr. |
| 5,291,704 A | | 3/1994 | Savorani |
| 5,568,847 A | * | 10/1996 | Guilloud et al. ............. 188/313 |
| 5,683,131 A | | 11/1997 | Lucas |
| 5,931,415 A | * | 8/1999 | Lingard et al. ............. 244/129.5 |
| 6,394,393 B1 | | 5/2002 | Mort |
| 6,454,210 B1 | * | 9/2002 | Plattner ...................... 244/129.5 |
| 6,530,544 B2 | * | 3/2003 | Milliere ........................ 244/213 |
| 6,663,314 B2 | | 12/2003 | Bequet |
| 6,732,976 B2 | * | 5/2004 | Hessling et al. .............. 244/119 |
| 6,769,831 B2 | * | 8/2004 | Aquino et al. ................ 403/350 |
| 6,848,650 B2 | | 2/2005 | Hoisignton et al. |
| 6,883,753 B1 | * | 4/2005 | Scown ....................... 244/118.1 |
| 6,889,939 B2 | | 5/2005 | Rouyre et al. |
| 7,021,587 B1 | * | 4/2006 | Younkin ...................... 244/178 |
| 7,073,994 B2 | | 7/2006 | Huber et al. |
| 7,214,015 B2 | | 5/2007 | Johannes |
| 7,234,668 B2 | | 6/2007 | Wollaston et al. |
| 7,370,452 B2 | | 5/2008 | Rogers |
| 7,374,137 B2 | * | 5/2008 | Staney ....................... 248/122.1 |
| 7,407,135 B2 | * | 8/2008 | Rouyre ........................ 244/119 |
| 7,462,006 B2 | | 12/2008 | Benthien |
| 7,497,638 B2 | * | 3/2009 | Tubbs et al. ..................... 403/76 |
| 7,594,701 B2 | | 9/2009 | Kawabata et al. |
| 7,637,686 B2 | * | 12/2009 | Wood et al. ................. 403/302 |
| 7,648,115 B2 | * | 1/2010 | Lambert et al. .............. 248/429 |
| 7,748,661 B2 | * | 7/2010 | Harris et al. ................. 244/131 |
| 7,775,479 B2 | | 8/2010 | Benthien |
| 7,784,734 B2 | * | 8/2010 | Christman ................ 244/102 R |
| 7,895,810 B2 | | 3/2011 | Benthien |
| 8,220,744 B2 | | 7/2012 | Benthien |
| 2003/0168554 A1 | | 9/2003 | Rouyre et al. |
| 2003/0205011 A1 | | 11/2003 | Bequet |
| 2003/0209929 A1 | * | 11/2003 | Muin et al. ................... 297/331 |
| 2004/0245391 A1 | | 12/2004 | Kunzel et al. |
| 2004/0258498 A1 | | 12/2004 | Bruns |
| 2005/0211833 A1 | | 9/2005 | Frantz et al. |
| 2005/0224650 A1 | | 10/2005 | Reed et al. |
| 2006/0011781 A1 | | 1/2006 | Knoll et al. |
| 2006/0108477 A1 | | 5/2006 | Helou, Jr. et al. |
| 2006/0237586 A1 | | 10/2006 | Barackman et al. |
| 2006/0278761 A1 | * | 12/2006 | Cutler et al. ............. 244/135 A |
| 2008/0099601 A1 | * | 5/2008 | Christman ................ 244/102 A |
| 2008/0112753 A1 | * | 5/2008 | Tubbs et al. .................. 403/122 |
| 2008/0173755 A1 | | 7/2008 | Benthien |
| 2008/0173758 A1 | | 7/2008 | Benthien |
| 2008/0173761 A1 | | 7/2008 | Benthien |
| 2008/0213034 A1 | * | 9/2008 | Wood et al. .................... 403/122 |
| 2010/0044510 A1 | | 2/2010 | Schroeer et al. |
| 2010/0051746 A1 | * | 3/2010 | Law .......................... 244/118.6 |

FOREIGN PATENT DOCUMENTS

| | | |
|---|---|---|
| DE | 103 19 503 A1 | 11/2004 |
| DE | 103 24 648 A1 | 12/2004 |
| DE | 10324648 | 12/2004 |
| DE | 698 27 627 T2 | 3/2005 |
| EP | 1637449 A1 | 3/2006 |
| FR | 2599793 | 11/1987 |
| FR | 1234984 | 8/2002 |
| FR | 2821129 | 8/2002 |
| FR | 1342927 | 9/2003 |
| FR | 2836890 | 9/2003 |
| FR | 2883939 | 10/2006 |
| GB | 2026623 | 2/1980 |
| JP | 55-017797 | 2/1980 |
| SU | 1539430 A1 | 1/1990 |
| WO | WO 97/31820 | 9/1997 |

OTHER PUBLICATIONS

Office Action for U.S. Appl. No. 12/008,975 dated Jun. 14, 2010.
Notice of Allowance for U.S. Appl. No. 12/009,620 dated Oct. 15, 2010.
Non-final Office Action for U.S. Appl. No. 12/009,149 dated Oct. 19, 2010.
German Office Action for DE 10 2007 001613.8 dated Nov. 19, 2010.
Office Action for U.S. Appl. No. 12/008,975 dated Nov. 23, 2010.
German Office Action for DE 10 2007 011621 dated Dec. 10, 2009.
Final Office Action for U.S. Appl. No. 12/008,975 dated Nov. 23, 2010.
Non-Final Office Action for U.S. Appl. No. 12/009,149 dated Mar. 18, 2011.
Office Action dated Dec. 14, 2009 from U.S. Appl. No. 12/009,625.
German Office Action for DE 10 2007 011611 dated Dec. 8, 2009.
Notice of Allowance from U.S. Appl. No. 12/009,625 dated May 18, 2010.
Non-Final Office Action for U.S. Appl. No. 12/008,975 dated Apr. 25, 2011.
Final Office Action for U.S. Appl. No. 12/009,149 dated Aug. 18, 2011.
Final Office Action for U.S. Appl. No. 12/008,975 dated Sep. 30, 2011.
Notice of Allowance for U.S. Appl. No. 12/009,149 dated Dec. 8, 2011.
Russian Grant Notice for RU 2009130305/11(042288) dated Jan. 13, 2012.
Notice of Allowance for U.S. Appl. No. 12/009,149 dated Mar. 23, 2012.
Notice of Allowance for U.S. Appl. No. 12/008,975 dated Jun. 15, 2012.
German Office Action for Application Serial No. DE 10 2007 011 619.7-22 dated Dec. 16, 2009.
Japanese Office Action for Appl. 2009-545894 dated Aug. 22, 2012.
Notice of Allowance for U.S. Appl. No. 12/008,975 dated Sep. 4, 2012.

* cited by examiner

DEVICE, IN PARTICULAR CONNECTION ROD, FOR BRACING A FUSELAGE STRUCTURE OF AN AIRCRAFT AND/OR FOR FASTENING A COMPONENT

FIELD OF THE INVENTION

The invention relates to a device, in particular a connection rod (also know as "Samer rod" or "Samer-type rod"), for bracing a fuselage structure of an aircraft and/or for fastening a component on the fuselage structure, comprising a central portion and two end portions which adjoin this.

BACKGROUND OF THE INVENTION

Known embodiments of connection rods generally have a hollow-cylindrical central portion adjoined on both sides by end portions. The diameter of the central portion can correspond to the diameter of both end portions. Alternatively, the central portion can taper towards the end portions. Eyebolts can be screwed preferably on both sides into the end portions in order to achieve length adjustability. The connection rods are used, for example, to fasten components on the fuselage structure or for bracing or reinforcing the same. In order to link the connection rod to the structure of the aircraft, a clamp or a forked bracket is generally riveted to the structure. The clamp has a bore in which a bolt can be fastened for pivotable coupling of one of the two eyebolts of the connection rod. A connection rod created in this manner is length-adjustable and can additionally be pivoted around an axis. A pivotability around a further axis is not possible with this mounting concept.

This mechanical linking of the known connection rods to the fuselage structure has, in particular, the disadvantage that a plurality of individual parts is required and moreover rivet connections must be positioned in the fuselage structure for fastening the clamps. As a result, the weight, on the one hand, and the manufacturing cost, on the other, of such a reinforcing or holding arrangement by means of a connection rod increase significantly.

SUMMARY OF THE INVENTION

The object of the invention is to create a device which enables a bracing of the fuselage structure and/or a linking of components to the fuselage structure while at the same time reducing the number of individual parts required, and in which at least a pivotability on one side and in addition the option of an introduction of load in the region of the neutral fibres is possible.

This object is achieved by a device with the features of Patent Claim 1.

As a result of the fact that a joint is arranged in the region of at least one end portion, the joint being integrated in the fuselage structure or in the component and being pivotable around at least one rotational axis, a smaller number of individual parts and thus a reduced weight are produced in comparison to previously known linking concepts, wherein, however, pivotability around at least one axis is provided.

Moreover, the introduction of force preferably takes place in the region of the neutral fibres of the fuselage structure so that the lever effect which occurs with the previously known embodiment of the device of the connection rod with clamps or forked brackets in the case of introduction of force is largely avoided.

One advantageous configuration provides that the at least one joint is embodied as a barrel nut which is pivotably received in a bearing bore in the fuselage structure for integral linking of the device of the connection rod to the fuselage structure.

This results in a structure of particularly simple design of the device according to the invention on a fuselage structure of an aircraft which suffices with a minimal number of components and which simultaneously enables a pivotability around at least one axis in the space.

According to a further development of the invention, it is provided that a passage bore is positioned in the fuselage structure with oversize relative to the threaded rods.

As a result of this, a sufficient mobility is ensured, i.e. in particular pivotability of the threaded rod screwed into the barrel nut around an axis in the space.

According to another further development of the invention, the fuselage structure has a thickening in the region of the bearing bore.

The thickenings are required to achieve a seat of the barrel nuts which are received in the bearing bore which can withstand sufficient mechanical loads.

It is furthermore provided that, in addition, an inner barrel nut is pivotably received in the outer barrel nut. This configuration enables a pivotability of the device according to the invention around a further axis in the space.

According to a further advantageous configuration, it is provided that the end portions adjoining the central portion on both sides are respectively provided with a thread.

As a result of this, a simplified structure of the device is produced, wherein the central portion and the end portions adjoining this on both sides are preferably embodied in one piece and solidly as threaded bolts. This configuration is particularly suitable for fastening components, in particular vertical supports of a lining frame on the fuselage structure of the aircraft. The lining frame is used to suspend material seats in an aircraft for military applications.

The forces which occur are introduced by the device preferably in the region of the neutral fibres of the component. The susceptibility to buckling of a linear component with respect to vertical loads is reduced by the articulated linking of the component in the fastening point. As a result, the relevant component can be dimensioned to be statically lighter and thus weight-saving.

Further advantageous configurations of the device are explained in the further patent claims.

BRIEF DESCRIPTION OF THE DRAWINGS

In the drawings.

The same design elements respectively have the same reference numbers in the drawing.

DETAILED DESCRIPTION OF THE DRAWINGS

Figure 1:
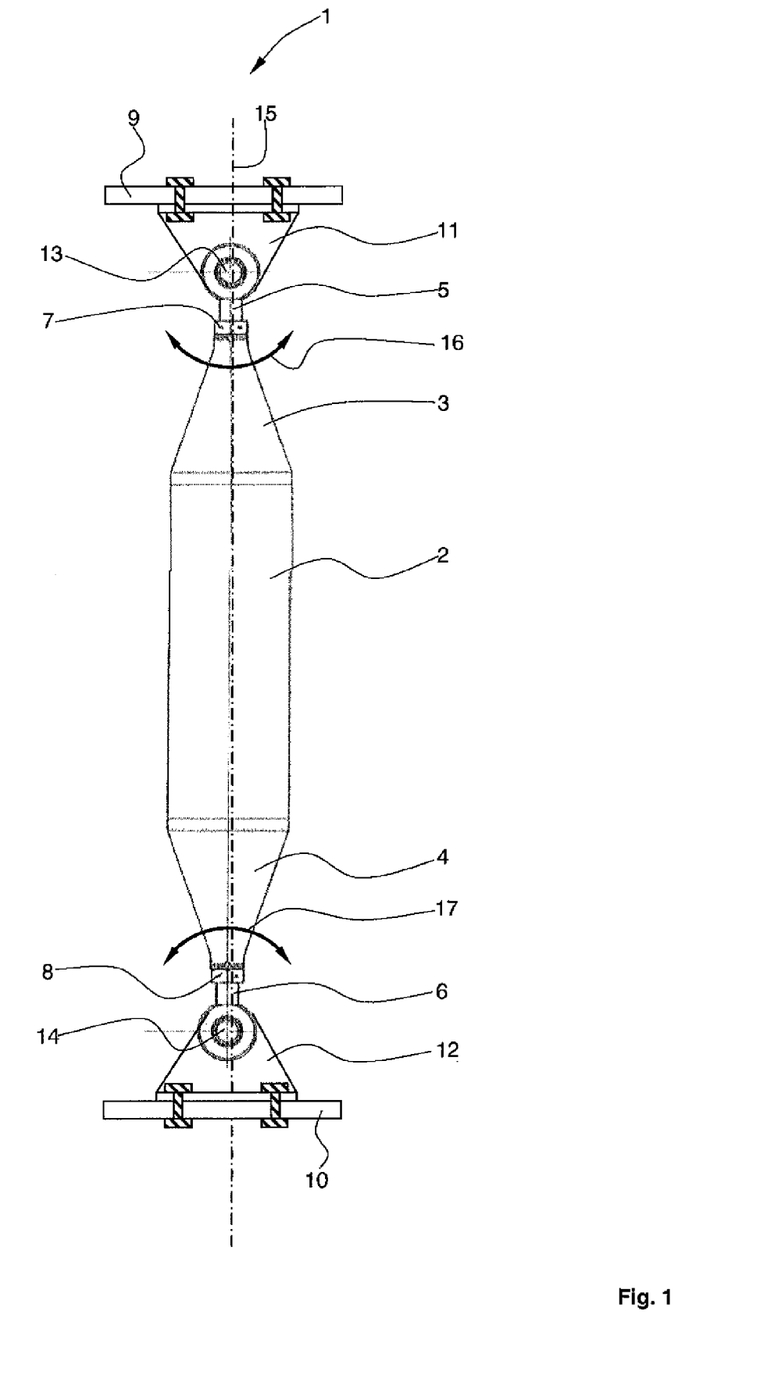
FIG. 1 shows one exemplary embodiment of a previously known connection rod.

FIG. 1 shows a device formed with a conventional connection rod for bracing or fastening components to a fuselage structure.

A connection rod 1 encompasses, among other things, a central portion 2 and two end portions 3,4. An eyebolt 5,6 is respectively screwed into both end portions 3,4. Eyebolts 5,6 are secured with locknuts 7,8. The linking of connection rod 1 to a fuselage structure 9,10 is performed with two clamps 11,12 which are riveted to fuselage structure 9,10 by means of rivets which are not shown in greater detail. The articulated connection between eyebolts 5,6 and clamps 11,12 is performed by two bolt connections 13,14. As a result of eyebolts 5,6 which can be screwed into end portions 3,4, a length adjustability of connection rod 1 is produced parallel to longitudinal axis 15. As a result of bolt connections 13,14, a pivotability of connection rod 1 with respect to clamps 11,12 around an axis is respectively provided, as indicated by both double arrows 16,17.

Figure 2:
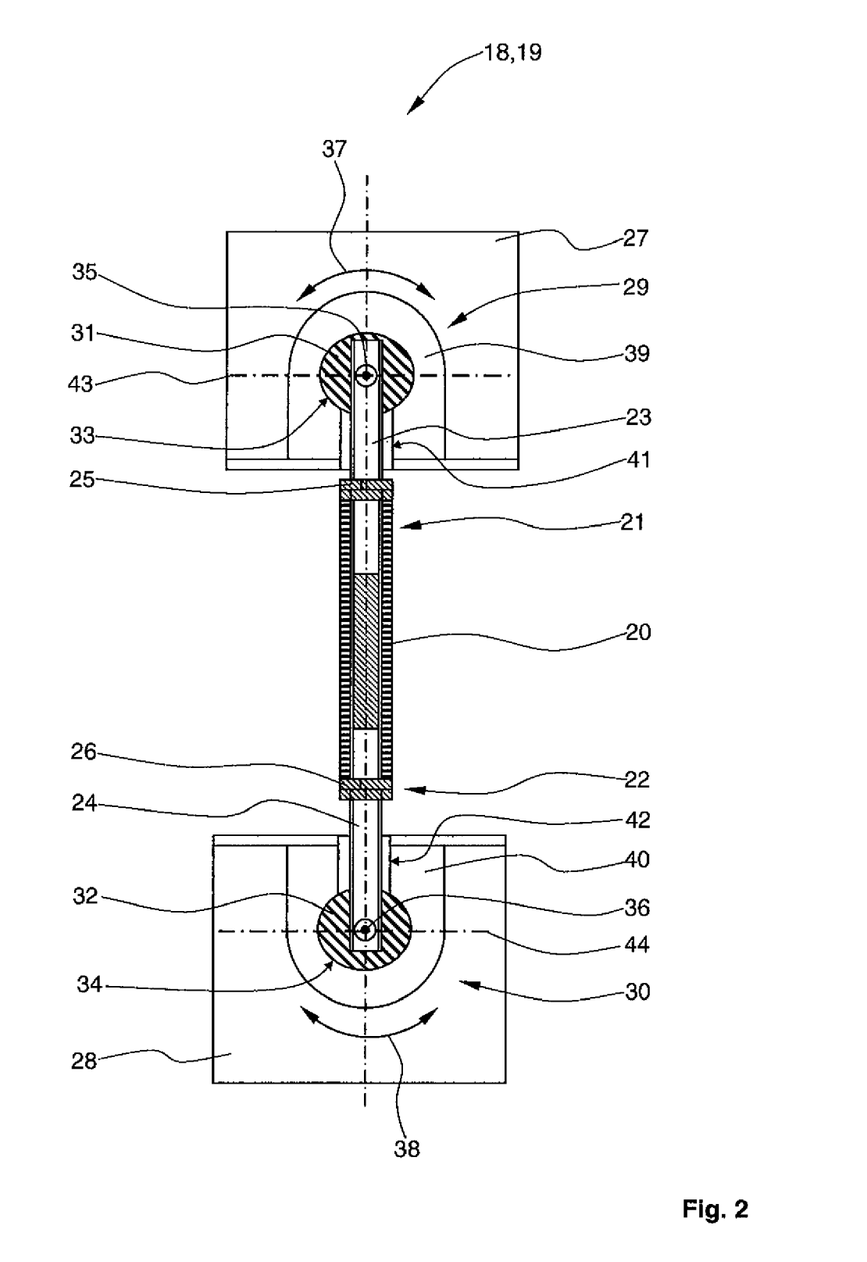
FIG. 2 shows a first embodiment variant of the device according to the invention.

FIG. 2 shows a first embodiment variant of the device according to the invention.

A device 18 is embodied as a "short" connection rod 19 which has a constant cross section for weight reduction in comparison to the conventional connection rod described above. connection rod 19 encompasses, among other things, a central portion 20 which is adjoined on both sides by end portions 21,22. Central portion 20 is embodied in the form of a tube and is provided on both sides with an internal thread. The internal threads in end portions 21,22 can be embodied in the opposite direction or in the same direction (left and/or right thread). The internal threads in end portions 21,22 are preferably embodied in the opposite direction so that a length adjustment of connection rod 19 can take place by simple rotation of central portion 20 around its longitudinal axis. Central portion 20 can have flat sections, grooves, milled areas or the like in order to facilitate the rotation of central portion 20 by means of a correspondingly embodied tool for length adjustment. Threaded rods 23,24 can respectively be screwed into end portions 21,22. Threaded rods 23,24 are secured with locknuts 25,26 on end portions 21,22 against unintentional detachment. Alternatively, central portion 20 can also have an external thread onto which, in this case, hollow-cylindrically embodied threaded rods with an internal thread can be screwed. Moreover, end portions 21,22 can be embodied conically (cf. FIG. 1). End portions 21,22 and central portion 20 can be embodied hollow-cylindrically and/or at least in sections solidly. It is vital that threaded rods 23,24 can be screwed sufficiently far into end portions 21,22 for length adjustment.

A joint 29,30 is respectively integrated into a fuselage structure 27,28. Fuselage structure 27,28 can, for example, be an integral frame, a frame or annular frame. Joints 29,30 are formed with two barrel nuts 31,32 which are pivotably received respectively in a bearing bore 33,34 within fuselage structure 27,28. Barrel nuts 31,32 are received in bearing bores 33,34 pivotably around both rotational axes 35,36 (respectively perpendicular to the plane of the drawing), as indicated by both double arrows 37,38. In the view of FIG. 2, barrel nuts 31,32 respectively have a threaded bore which is not shown in greater detail for a better overview in the drawing and into which threaded rods 23,24 can be screwed.

In order to receive barrel nuts 31,32, fuselage structure 27,28 respectively has a thickening 39,40 in the region of bearing bores 33,34. Passage bores 41,42 are respectively arranged in fuselage structure 27,28, passage bores 41,42 being used to pass through both threaded rods 23,24. Passage bores 41,42 are designed with oversize with respect to threaded rods 23,24, i.e. a diameter of passage bores 41,42 is respectively selected to be larger than a diameter of threaded rods 23,24 in order to ensure a sufficient pivotability of both threaded rods 23,24. The introduction of force by means of both barrel nuts 31,32 preferably takes place in the region of neutral fibres 43,43 within fuselage structure 27,28. As a result of this, the occurrence of local load peaks in fuselage structure 27,28 is reduced in comparison to the prior art as a result of the lever action of clamps 11,12 (cf. FIG. 1).

As a result of barrel nuts 31,32 arranged integrally in fuselage structure 27,28, clamps 11,12 (forked brackets), eyebolts 5,6 and the associated bolt connections which are generally formed respectively with a screw bolt and a screw nut are no longer required for linking connection rod 19 to fuselage structure 27,28. As a result of this, a significant weight saving is produced alongside a simultaneously increased reliability against failure of entire device 18 due to the reduced number of components.

Figure 3:
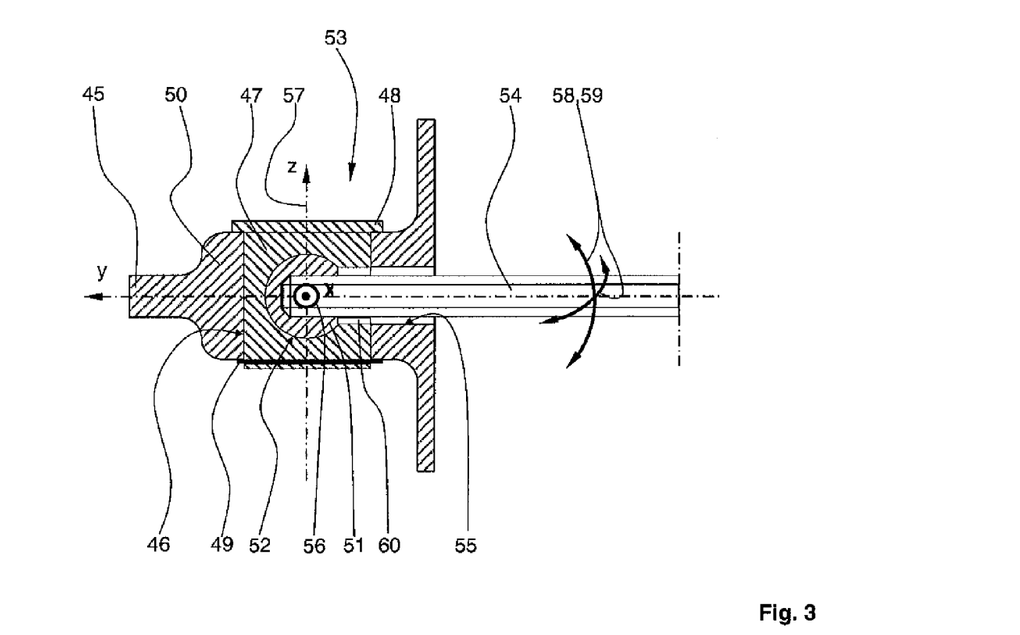
FIGS. 3-4 show a simplified principal view of a second embodiment variant of the device according to the invention.
Figure 4:
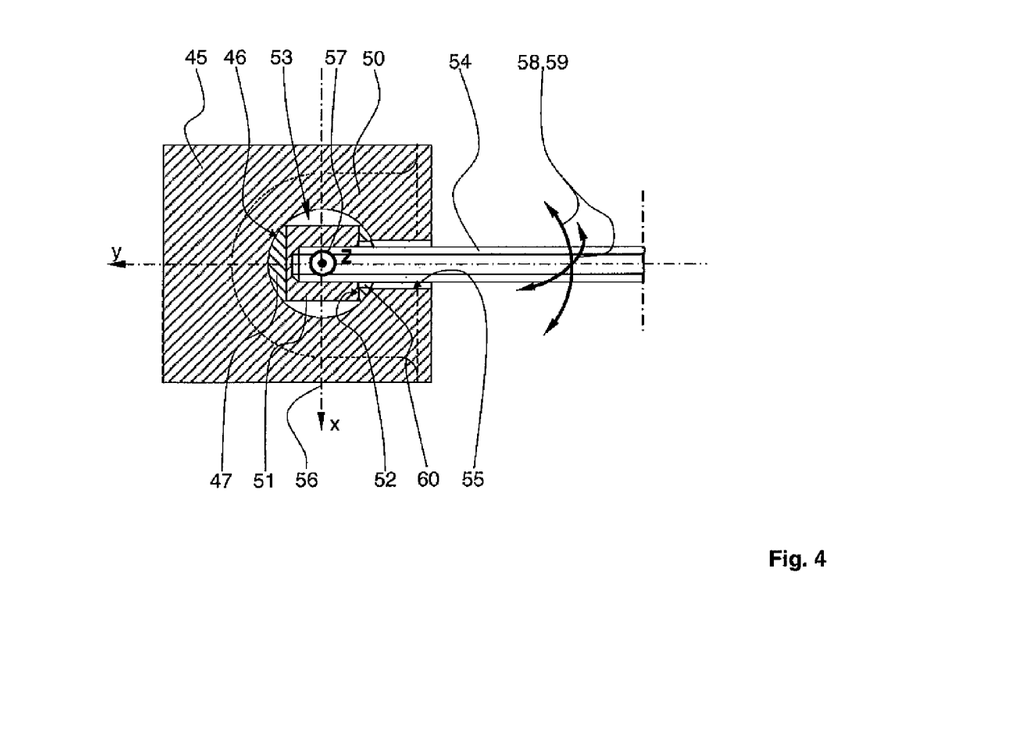

FIGS. 3 and 4, to which reference is simultaneously made in the following part of the specification, show a simplified (one-sided) view of a second embodiment variant of the device according to the invention. FIG. 3 shows a top view and FIG. 4 illustrates a side view of the second embodiment variant. The x-, y- and z-axes of a co-ordinate system symbolise the orientation in the space.

In contrast to the view according to FIG. 2, the views only show one side of the fuselage structure and a joint arranged thereon with a screwed-in threaded rod. The connection rod and the right-hand part of the device including the right-hand fuselage structure have been omitted in FIGS. 3, 4 respectively to enable a clearer view. The cited assemblies are embodied mirror-symmetrically to the parts shown. In contrast to the embodiment variant according to FIG. 2, the "biaxial" barrel joint used in FIGS. 3, 4 enables pivoting of the threaded rod or respectively the connection rod connected thereto around two rotational axes in the space.

An outer barrel nut 47 which is rotatable around the z-axis is countersunk into a fuselage structure 45 in a bearing bore 46. The securing of outer barrel nut 47 against axial displacements parallel to the z-axis is performed, for example, with a flange 48 and a retaining ring 49 arranged in a groove which is not designated. In order to be able to receive outer barrel nut 47, fuselage structure 45 has a thickening 50 in the region of bearing bore 46. A smaller inner barrel nut 51 is rotatably received in a further bore 52 in outer barrel nut 47. Inner barrel nut 51 is rotatable around the x-axis, i.e. the rotational axes (z-axis and x-axis) of (outer) barrel nut 47 and of inner barrel nut 51 enclose an angle of 90° and together form a (cardan) joint 53 or a so-called "biaxial" barrel joint which has two degrees of freedom. In order to link the connection rod not shown in FIGS. 3, 4, inner barrel nut 51 has a threaded bore which is not provided with a reference number and into which a threaded rod 54 can be screwed. In order to ensure a sufficient pivotability of threaded rod 54 and thus of a screwed-on connection rod or a tube with an internal thread, a passage bore 55 whose diameter has a sufficient oversize in comparison to a diameter of threaded rod 54 is positioned in fuselage structure 45.

In comparison to the embodiment variant according to FIG. 2, the embodiment variant according to FIGS. 3, 4 offers a higher mobility of the connection rod with respect to fuselage structure 45 around two rotational axes 56,57 (x-axis, z-axis, 2 degrees of freedom) in the space as indicated by double arrows 58,59 alongside an only slightly increased number of components required.

A further bore 60 is positioned in (outer) barrel nut 47 to ensure a sufficient mobility of threaded rod 54. Bore 60 is designed with a suitable oversize with regard to its diameter in relation to the diameter of threaded rod 54.

Fuselage structure 9,10,27,28,45 is preferably formed with an aluminium alloy material. All barrel nuts 31,32,47,51 can be provided with a friction-reducing layer, such as, for example, a Teflon® layer as a lifetime lubrication. Alternatively, barrel nuts 31,32,47,51 can also be entirely formed with a friction-reducing material which is suitable with regard to the aluminium alloy material of fuselage structure 9,10,27,28,45, such as, for example, bronze or other non-ferrous heavy metals.

Figure 5:
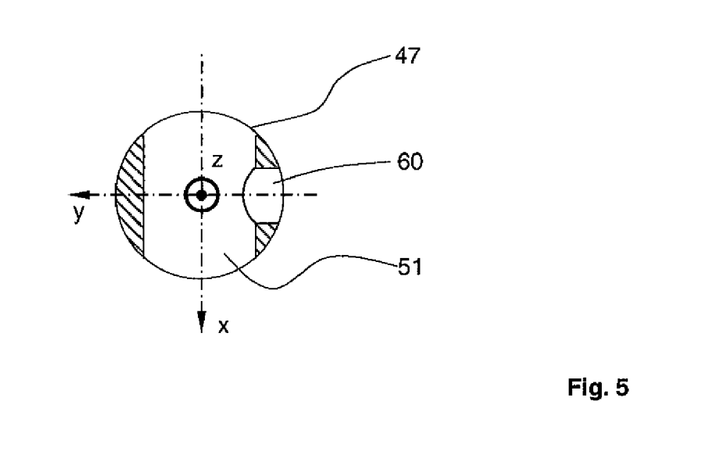
FIGS. 5-7 show detailed views of the second embodiment variant.
Figure 6:
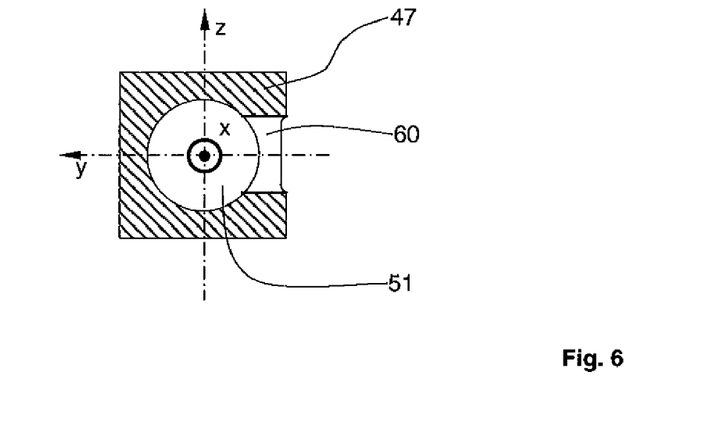
Figure 7:
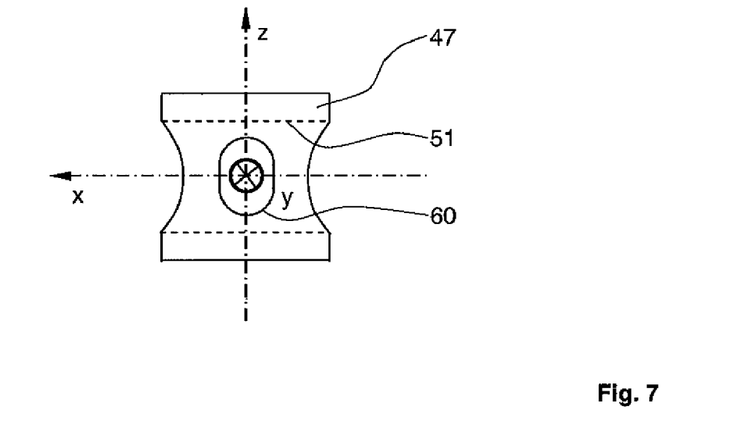

FIGS. 5 to 7, to which reference is made in parallel below, show a detailed inner view of used (cardan) joint 53 (cf. FIGS. 3, 4) from various views. The three spatial directions are illustrated by the x-, y- and z-axis of a co-ordinate system. Inner barrel nut 51 is rotatably received in outer barrel nut 47 and forms in interaction with outer barrel nut 47 joint 53 or the cardan joint which enables the mobility of the device according to the invention around two rotational axes.

Bore 60 is positioned with oversize in outer barrel nut 47. As is particularly apparent from FIG. 7, bore 60 has an oval cross-sectional geometry in order to achieve a sufficient mobility of the threaded rod (mobility of joint 53). Other cross-sectional geometries such as, for example, circular or elliptical are equally possible.

Figure 8:
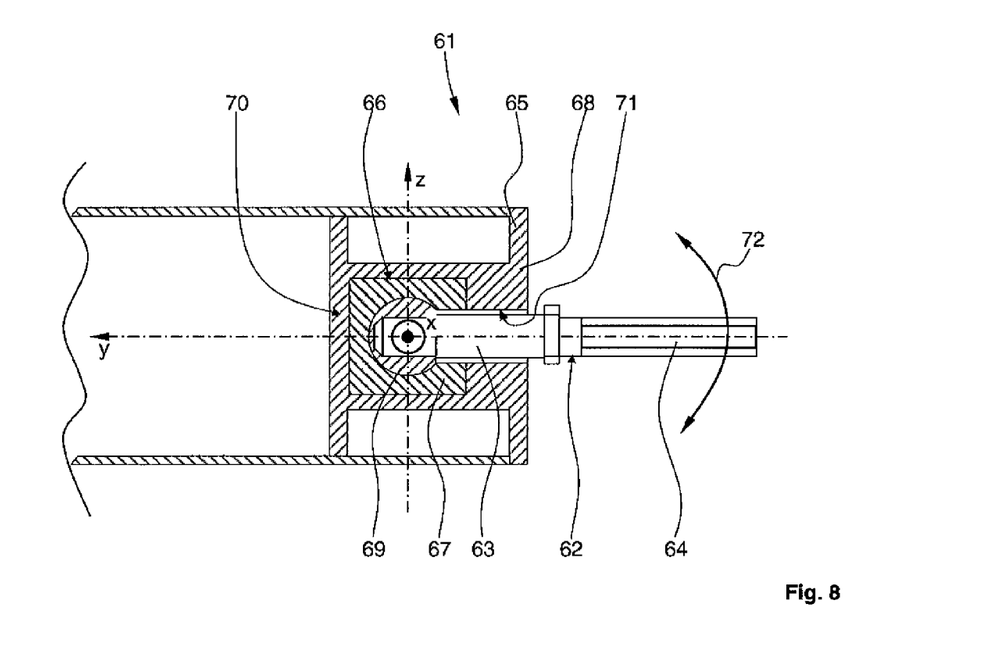
FIGS. 8-10 show a further variant of the device for one-sided articulated linking of components to the fuselage structure.
Figure 9:
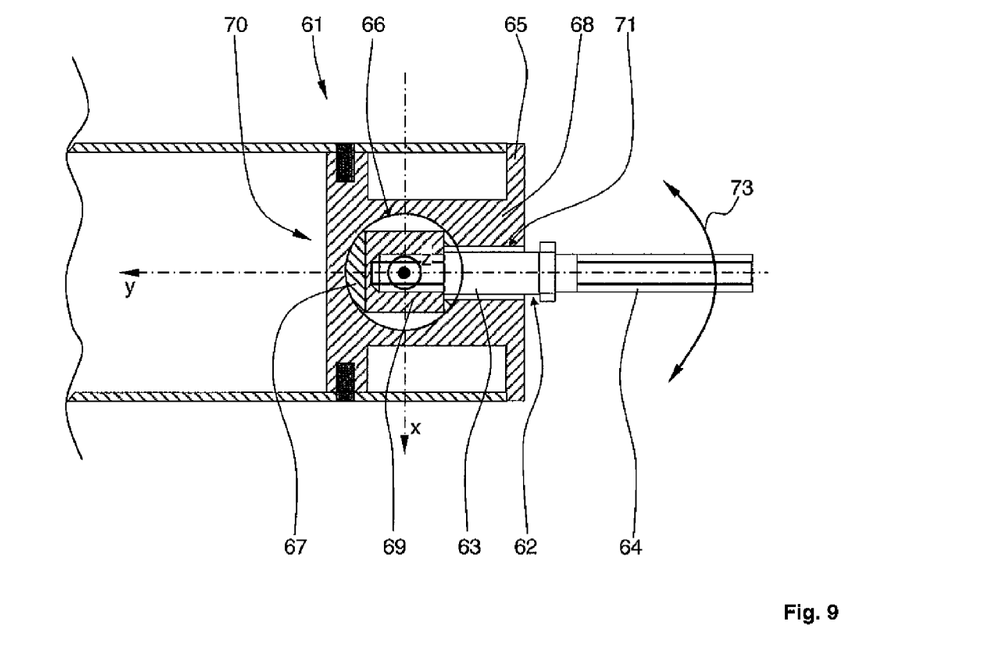
Figure 10:
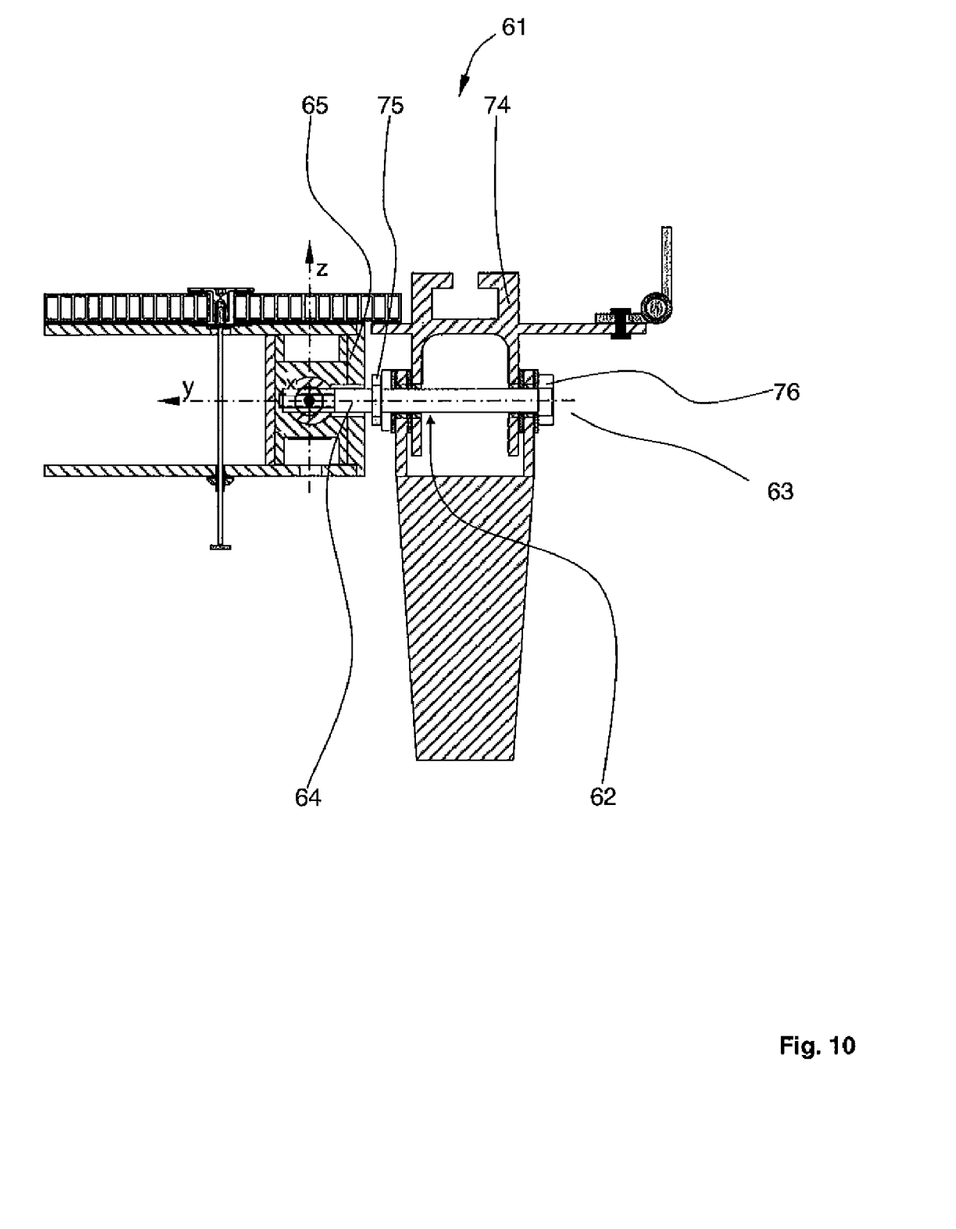

FIGS. 8 to 10 show a further embodiment variant of the device which is particularly intended for fastening vertical struts of a so-called lining frame on the fuselage structure of an aircraft. In contrast to the embodiment variants described above, only a one-sided articulating linking is produced with this device. The position of the device in the space is illustrated by means of the x-axis, y-axis and z-axis which form a co-ordinate system.

FIG. 8 shows a cross-sectional view through a device 61. FIG. 9 shows the same device 61 but in a view which is pivoted by 90° around the y-axis so that reference can also be made below to both FIGS. 8, 9.

Device 61 encompasses, among other things, a substantially cylindrical or hollow-cylindrically embodied central portion 62 which is adjoined by end portions 63,64 on both sides. A thread, not designated in greater detail, is respectively applied to end portions 63,64. Both end portions 63,64 form together with central portion 62 a one-piece threaded bolt, but can, however, be embodied hollow in sections for weight reduction where required. In order to link a component 65, component 65 has a bearing bore 66 in which an (outer) barrel nut 67 is pivotably received. Component 65, which in the shown exemplary embodiment of FIGS. 8 to 10, is a vertical support of a so-called lining frame, can have a thickening 68 in the region of bearing bore 66 to provide a sufficient material strength to position bearing bore 66. Outer barrel nut 67 is pivotable around the z-axis as a rotational axis. A second, inner barrel nut 69 is pivotably received within barrel nut 67. To this end, outer barrel nut 67 has a bore with a corresponding diameter for bearing inner barrel nut 69. Inner barrel nut 69 is pivotable around the x-axis as a rotational axis, i.e. the pivot axes or the rotational axes (z-axis, x-axis) of (biaxial) joint 70 formed by means of both barrel nuts 67,69 with two degrees of freedom intersect one another at an angle of 90°. A point of intersection of the pivot or rotational axes is preferably selected such that this lies approximately in the region of a neutral fibre of component 65 in order to achieve an optimum introduction of force into component 65. The "freedom from moment" of the transmission of force between component 65 and the fuselage structure not shown in FIGS. 8, 9 is ensured in this case by the articulated linking by means of the biaxial barrel joint. As a result of the "moment-free" introduction of force, the risk of buckling which is substantially solely decisive, for example, for the dimensioning of such vertical supports is reduced as a result of the mobility in the linking point. Therefore, the weight of the vertical support which is linked to the fuselage structure with the device according to the invention can be reduced in comparison to a "moment-rigid" (fixed) link to the (primary) fuselage structure.

Inner barrel nut 69 has a threaded bore, not designated by a reference number for a better overview in the drawing, into which (first) end portion 63 of device 61 can be screwed. In order to pass though end portion 63, component 65 has a passage bore 71. In order to ensure a sufficient mobility of end portion 63 in the direction of both double arrows around both pivot axes, passage bore 71 is designed with an oversize with respect to an outer diameter of end portion 63. (Second) end portion 64 is likewise provided with a thread and is used in this case for substantially rigid linking of component 65 to the parts not shown in FIGS. 8, 9 of a fuselage structure of the aircraft.

FIG. 10 illustrates the linking of component 65 by means of device 61 to a part of a fuselage structure 74 of an aircraft.

To this end, (second) end portion 64 of central portion 62 of device 61 is guided by bores, not designated in greater detail, in fuselage structure 74 and, for example, fixedly screwed and secured to fuselage structure 74 by means of threaded nuts 75,76 screwed onto left and/or right end portion 63,64. Device 61 represents in this context a mechanical reinforcement of component 65 against buckling in the case of high loads running parallel to the x-axis or a fastening means for fixing component 65 to fuselage structure 74.

In the exemplary embodiment shown, component 65 is a vertical support, which runs perpendicular to the plane of the drawing, of a lining frame (secondary structure) which is used to suspend a plurality of material seats which are arranged transverse to the direction of flight of the aircraft while forming two (seat) rows on both sides along fuselage longitudinal sides.

LIST OF REFERENCE NUMBERS 1 connection rod
2 Central portion
3 End portion
4 End portion
5 Eyebolt
6 Eyebolt
7 Locknut
8 Locknut
9 Fuselage structure
10 Fuselage structure
11 Clamp
12 Clamp
13 Bolt connection
14 Bolt connection
15 Longitudinal axis
16 Double arrow
17 Double arrow
18 Device
19 connection rod
20 Central portion
21 End portion
22 End portion
23 Threaded rod
24 Threaded rod
25 Locknut
26 Locknut
27 Fuselage structure
28 Fuselage structure
29 Joint
30 Joint 31 Barrel nut
32 Barrel nut
33 Bearing bore
34 Bearing bore
35 Rotational axis (barrel nut)
36 Rotational axis (barrel nut)
37 Double arrow
38 Double arrow
39 Thickening
40 Thickening
41 Passage bore
42 Passage bore
43 Neutral fibres
44 Neutral fibres
45 Fuselage structure
46 Bearing bore
47 Outer barrel nut
48 Flange
49 Retaining ring
50 Thickening
51 Inner barrel nut
52 Bore
53 Joint
54 Threaded rod
55 Passage bore
56 Rotational axis (x-axis)
57 Rotational axis (z-axis)
58 Double arrow
59 Double arrow
60 Bore
61 Device
62 Central portion
63 (First) end portion
64 (Second) end portion
65 Component
66 Bearing bore
67 (Outer) barrel nut
68 Thickening
69 Inner barrel nut
70 Joint
71 Passage bore
72 Double arrow
73 Double arrow
74 Fuselage structure
75 Threaded nut
76 Threaded nut

What is claimed is:

1. A device comprising a connection rod combined with a fuselage structure of an aircraft for bracing the fuselage structure of an aircraft and for fastening a component on the fuselage structure, said device comprising a central portion and two end portions, wherein a joint is arranged in the region of at least one end portion, the joint being integrated in the fuselage structure or in the component and being pivotable around at least one rotational axis, characterized in that the device has said joint is formed with a barrel nut, wherein the barrel nut is rotatably received in a bearing bore in the component and an end portion is screwed into the barrel nut and the other end portion is screwed to the fuselage structure and that the component is comprised of a vertical support of a lining frame for mounting a plurality of seats; and wherein an inner barrel nut is pivotably received in the barrel nut, wherein the end portion is screwed into the inner barrel nut (−69).

2. The device according to claim 1, wherein a threaded rod is respectively screwed onto the end portions.

3. The device according to claim 1, wherein the at least one joint is formed with a barrel nut which is rotatably received in a bearing bore in the fuselage structure and into which a threaded rod (23, 24, 54) can be screwed.

4. The device according to claim 2, wherein a passage bore is arranged in the fuselage structure, the diameter of the passage bore being larger than a diameter of the threaded rods in order to enable the screwing of one of the threaded rods into the joint and thus a sufficient mobility.

5. The device according to claim 1, wherein the fuselage structure has a thickening in the region of the bearing bore.

6. The device according to claim 3, wherein, wherein the threaded rod can be screwed into the inner barrel nut and the threaded rod can be pivoted around two rotational axes.

7. The device according to claim 6, wherein the rotational axes of the barrel nuts and of the inner barrel nut enclose an angle of 90° to one another.

8. The device according to claim 3, wherein the barrel nut has a circumferential flange and a circumferential groove with a retaining ring in order to prevent an axial displacement in the bearing bore.

9. The device according to claim 1, wherein the central portion of the connection rod respectively tapers towards the end portions.

10. The device according to claim 6, wherein the barrel nuts are provided with a friction-reducing layer and/or are formed with a material with a low coefficient of friction.

11. The device according to claim 1, wherein the end portions adjoining the central portion on both sides respectively have a thread at least in sections.

12. The device according to claim 11, wherein a passage bore is arranged in the component, the diameter of the passage bore being larger than a diameter of the end portion in order to enable a sufficient mobility.

13. The device according to claim 1, wherein the component has a thickening in the region of the bearing bore.

* * * * *